Dec. 5, 1939.  O. A. OLSEN  2,182,596
STEERING MECHANISM FOR AUTOMOBILES AND CORRESPONDINGLY STEERED VEHICLES
Filed March 17, 1937
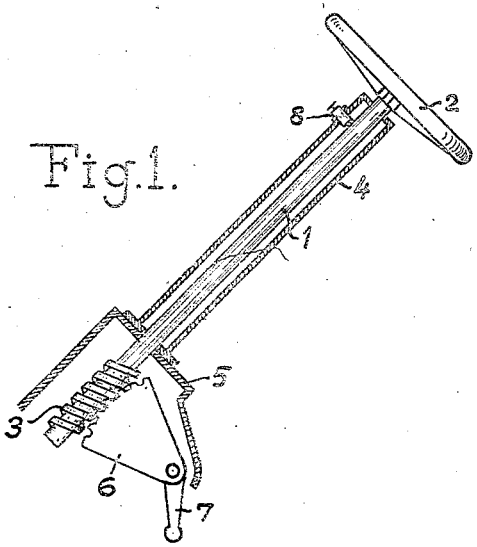
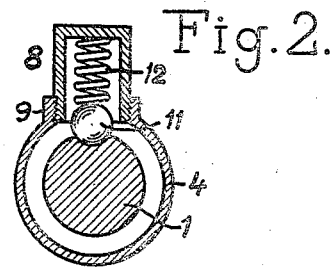
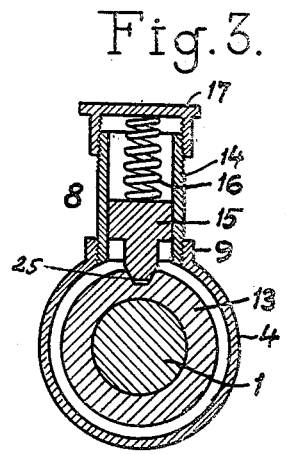 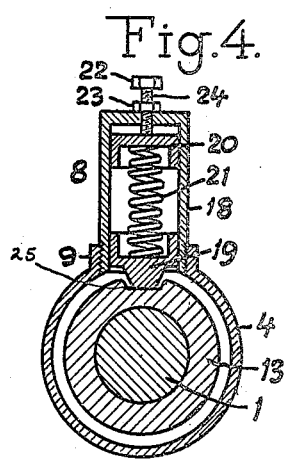
INVENTOR:
OLE ANDERSEN OLSEN
BY: Francis E. Boyer
ATTORNEY Patented Dec. 5, 1939

2,182,596

UNITED STATES PATENT OFFICE 2,182,596

STEERING MECHANISM FOR AUTOMOBILES AND CORRESPONDINGLY STEERED VEHICLES

Ole Andersen Olsen, Gentofte, Denmark

Application March 17, 1937, Serial No. 131,435
In Denmark March 18, 1936

3 Claims. (Cl. 74—495)

The present invention relates to improvements in the steering mechanism for automobiles and motorcycles and similar vehicles, serving to cause the vehicle to retain, with certainty, the once given direction straight forward, for instance by signalling or offering a resistance against the steering gear being adjusted in such a manner that the vehicle will alter its direction.

It happens frequently, for instance during driving along a straight road, that the driver suddenly becomes distracted in one way or other and thereby, without being aware of the fact, happens to actuate the steering gear and, thereby, to give the vehicle a wrong direction. If the vehicle is driving at a speed of for instance 40 miles an hour, the distance covered during only one second will be about 60 feet. By driving merely this short distance in a wrong direction, an accident may easily happen.

In automobiles it is a common feature that the convergency or the dish of the front wheels or the inclination of the steering pins will have a centering effect, to a certain extent, and it is similarly known to fit the steering mechanism with a spring device which when the wheels are turned sideways will tend to direct the same again forward for straight driving. The said last mentioned arrangements are mainly intended to prevent accidents in the case of breakages occurring on the transmission between the steering pillar (wheel) and the connecting rod between the steering arms of the wheels.

By the known devices there is certainly attained a certain resistance against the vehicle, owing to a rotation of the wheel, passing from the straight forward motion into a curve driving, but this resistance must naturally be rather weak and generally not suddenly occurring, as it increases with the magnitude of the rotation and, consequently, is not suitable for warning a driver who possibly—owing to the above mentioned distracting causes—at the moment occupies an inconvenient muscle-straining position, and therefore is rather insensitive to the resistance against rotation offered by the steering wheel.

The present invention has just for its object to give the driver a distinct warning when the wheel, or the steering gear connected thereto, is removed from the central position.

According to the invention, the steering gear or steering mechanism or parts connected directly or indirectly thereto are fitted with a device which offers a certain resistance, when the steering gear is moved out from its central position, but during the further motion away from the central position, does not have to offer any resistance, or which gives a signal, for instance an acoustic, optic or electric one, or produces a vibration of some kind or other, when the steering gear is moved out from its central position, in such a manner that the driver on the one hand cannot so easily unintentionally turn the steering gear in the wrong direction and, on the other hand—will instantly be notified of the fact that the vehicle is changing its direction.

As the invention has for its object to give a warning about the change in the direction of driving produced by the rotation of the wheel, it is evident that the device may be disposed at the part of the steering gear that is rigidly connected to wheel, notwithstanding any play in the steering gear itself.

In the drawing accompanying this specification,

Fig. 1 is a longitudinal sectional view of the steering post of a motor vehicle, showing the improved device attached thereto;

Fig. 2 is a transverse sectional view of the steering post of a motor vehicle and showing the improved device in the form of a ball lock;

Fig. 3 is a view similar to Fig. 2, but showing the device in the form of a snatch lock; and Fig. 4 is a view similar to Fig. 3, but showing a modified form of snatch lock.

As illustrated, by way of example in Fig. 1, the numeral 1 designates the steering post of an automobile provided at its upper end with the usual hand wheel 2, while its other free end is constructed with a worm thread 3, to engage a toothed sector 6 equipped with an arm 7 extending downwardly whereby any motion is transmitted to the front, or steering wheels of an automobile, in a manner known per se. The steering post 1 is encased in the customary manner by a steering column 4, which may be secured to the steering casing 5 in any conventional manner such as by bolts or the like. Secured to this column 4 is the steering device 8 which forms the subject-matter of the present invention and which comprises a spring-loaded ball 11, which is movably disposed and co-operates with a recess 25 or suitable cams on the steering pillar 1. The spring is marked 12, and is disposed in a casing 8, and is connected to the steering pillar or the body or the frame of the vehicle. The spring may be adjusted more or less tightly so as to acquire a suitable tension. During the driving in a direction straight forward, the ball rests in the recess. If the steering gear is turned in one or the other direction, the ball will be forced out from the recess. By selecting a relatively large ball and a powerful spring, the arrangement may be of such a nature that the force required to turn the steering gear will be so great that the driver cannot unintentionally rotate the same and, if he nevertheless happens to rotate the steering gear, he cannot possibly fail to notice the fact.

Instead of the spring-actuated ball, any other device with a similar action may be used, for instance a snatch-lock device as shown in Figs. 3 and 4, wherein guided blocks 15 and 19 respectively are arranged and adapted to slide in sleeves 14, 18 respectively attached to the steering column 4, said blocks being actuated by springs 16, 21 respectively. The blocks 15, 19 are suitably cone-shaped engaging a correspondingly forward recess 25, in a collar 13 firmly attached to the steering shaft 1. In Fig. 3, the spring 16 rests against a threaded cap 17 which closes the sleeve 14, and by means of which the tension of the spring can be adjusted. In Fig. 4, the spring 21 rests against a disk 20 which is adapted to slide within the sleeve 18, the position of the said disk and, thereby, the tension of the spring being adjustable by means of a screw 24, passing through the end of the sleeve 18, and having its position secured by means of nuts 22, 23. It will thus be seen that when the steering gear is brought out of its position, the cam 13 will exert resistance against this motion. The connection between the steering mechanism and the parts of the said locking devices or the like that are moving together with the said mechanism may be effected by means of a system of rods or cords of suitable nature.

The device may be adjusted more or less tightly, so that it can be adjusted, maybe during the driving, so as to exert a suitable resistance against motion. In the device there may be a slight play, in such a manner that the steering mechanism can be moved through a certain small angle, before any considerable resistance is exerted.

By means of the invention it thus becomes feasible, for a longer period than otherwise possible, to maintain the motor vehicle in the proper direction on the road, if the attention of the driver might be weakened for a moment.

As can be noted from Fig. 4, the groove or recess 25 is made slightly wider so as to allow a predetermined play to the engaging cone-shaped locking member 19, thereby rendering a turning of the steering shaft at a slight angle possible, prior to the locking member offering any resistance to such movement. If required a similar play may be provided for the recesses 25 in Figs. 2 and 3.

Having thus described my invention, what I claim is:

1. A safety device for indicating the deviation of the steering gear of a motor vehicle from its center position whereby the straight-ahead drive of the motor vehicle is ensured, comprising an elastically supported locking member disposed on a stationary part, a movable steering member having a groove in which said locking member rests during the straight ahead steering, while during a steering movement away from the center position the locking member is forced out of the groove, having the distinctive feature that the safety device is disposed at the steering column which holds the steering wheel and the articulated vehicle wheels in continuous transmission connection, and that the form of the groove and of the locking member is such that the changing of the motor vehicle from the center position or back into same is indicated to the driver by a "touch sensation" of the hand, the device being otherwise ineffective to resist such change.

2. Arrangement in accordance with claim 1, having the distinctive feature that the locking member comprises a ball which is supported in the manner known per se by a coil spring, and means for regulating (preferably with regulation of) the elasticity of said spring in the manner known per se.

3. Arrangement in accordance with claim 1, having the distinctive feature that the indication of the deviation from the center position is supplemented by the audible snapping or engaging noise connected therewith.

OLE ANDERSEN OLSEN.